United States Patent
Shinomiya et al.

(10) Patent No.: US 7,502,389 B2
(45) Date of Patent: Mar. 10, 2009

(54) SIGNALING CONTROL METHOD AND SIGNALING-BASED COMMUNICATION APPARATUS FURNISHED IN COMMUNICATIONS NETWORK SYSTEM

(75) Inventors: Norihiko Shinomiya, Kawasaki (JP); Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1125 days.

(21) Appl. No.: 10/406,769

(22) Filed: Apr. 3, 2003

(65) Prior Publication Data

US 2003/0208585 A1    Nov. 6, 2003

(30) Foreign Application Priority Data

Apr. 19, 2002    (JP) ............... 2002-117533

(51) Int. Cl.
*H04J 3/12* (2006.01)
*H04Q 11/00* (2006.01)
*H04L 12/40* (2006.01)

(52) U.S. Cl. .................. 370/522; 370/386; 370/438
(58) Field of Classification Search .................. None
See application file for complete search history.

(56) References Cited

U.S. PATENT DOCUMENTS

| | | | | |
|---|---|---|---|---|
| 5,610,977 A * | 3/1997 | Williams et al. | ....... | 379/221.13 |
| 5,802,145 A * | 9/1998 | Farris et al. | ............... | 379/32.03 |
| 6,009,100 A * | 12/1999 | Gausmann et al. | .......... | 370/397 |
| 6,055,232 A * | 4/2000 | Ward et al. | ................... | 370/385 |
| 6,580,791 B1 * | 6/2003 | Porter | ................... | 379/220.01 |
| 6,671,367 B1 * | 12/2003 | Graf et al. | ................... | 379/229 |
| 6,680,943 B1 * | 1/2004 | Gibson et al. | ................ | 370/392 |
| 6,714,544 B1 * | 3/2004 | Bosloy et al. | ............. | 370/395.1 |
| 6,765,912 B1 * | 7/2004 | Vuong | ..................... | 370/395.2 |
| 6,781,954 B1 * | 8/2004 | Aalto et al. | .................. | 370/230 |
| 6,931,010 B2 * | 8/2005 | Gallant et al. | ............. | 370/395.2 |
| 7,126,941 B1 * | 10/2006 | Clemm et al. | ................ | 370/352 |
| 7,289,456 B2 * | 10/2007 | Gupta et al. | ................. | 370/254 |
| 2004/0037328 A1 * | 2/2004 | Christie | ....................... | 370/522 |

FOREIGN PATENT DOCUMENTS

JP    6-244859    9/1994

OTHER PUBLICATIONS

Japanese Office Action dated Jul. 11, 2006.
Masatake Miyabe, et al. "A study of the GMPLS control architecture for IP photonic network" The Institute of Electronics, Information and Communication Engineers, vol. 101 No. 508, Dec. 10, 2001, pp. 61-66.
Kazuhiko Isoyama, et al. "A Proposal of GMPLS LSP Provisioning System" The Institute of Electronics, Information and Communication Engineers, Mar. 27-30, 2002, p. 346.

* cited by examiner

*Primary Examiner*—Chi H Pham
*Assistant Examiner*—Warner Wong
(74) *Attorney, Agent, or Firm*—Katten Muchin Rosenman LLP

(57) ABSTRACT

A communications network system, which is comprised of a management network, a control network, and a user transmission network, includes signaling-based communication apparatuses, each consisting of a control node and a communication node, and non-signaling-based communication apparatuses without having associated control nodes. In this system, a path can be established in a user data transmission network by controlling a signaling process on the control network. The configuration of the communication node of the non-signaling-based communication apparatus is changed by a network management system provided in the management network, while the configuration of the communication nodes of the signaling-based communication apparatus are changed by the associated control nodes by successively transmitting a signaling message to the next control node on the control network.

8 Claims, 11 Drawing Sheets

FIG.3

SPECIFIC ROUTING INFORMATION

| NODE ID | DESIGNATED UPLINK PORT | DESIGNATED DOWNLINK PORT |
|---------|------------------------|--------------------------|
| N1 | #17 | #19 |
| N2 | #28 | #21 |
| N3 | #34 | #32 |
| N4 | #41 | #49 |

FIG.4

ADJACENT NODE STATUS TABLE

| ADJACENT COMMUNICATION NODE | SIGNALING-CONTROL-BASED | AVAILABLE NODE FOR CONTROL MESSAGE TRANSMISSION |
|---|---|---|
| N1 | YES | — |
| N3 | NO | N4 |

SIGNALING CONTROL METHOD AND SIGNALING-BASED COMMUNICATION APPARATUS FURNISHED IN COMMUNICATIONS NETWORK SYSTEM

BACKGROUND OF THE INVENTION

The present invention relates to a signaling control technique for controlling a signaling process in a communications network system comprised of a managing network, a control network, and a user data transmission network operating independently from one another.

In recent years, to implement various types of IP-based multimedia services, techniques for controlling and managing a large-capacity IP (Internet protocol) photonics network have been attracting a great deal of attention. In the large-capacity IP network, WDM (wavelength division multiplexed), SONET (synchronous optical network)/SDH (synchronous digital hierarchy), and IP/MPLS (multiprotocol label switching) networks are integrated into a single system.

Conventionally, transmission-type core networks, typically represented by WDM and SONET/SDH techniques, are constructed as centralized management systems, through which services have been provided with high reliability. On the other hand, packet switching networks, typically represented by an IP/MPLS technique, are constructed as autonomously distributed flexible control system, which have high scalability. To make use of the advantages of both types of networks, while reducing the network operation cost, it becomes important to realize an intermediate system positioned across the centralized management and the autonomously distributed control.

To this end, various studies have been made, on the basis of the signaling techniques of OIF-UNI (optical interworking forum-user network interface) and GMPLS (generalized multiprotocol label switching). Such studies include, for example, setting a layer path or changing the frequency band on demand, and carrying out short-cut control of optical paths.

The outline of the GMPLS, which is the prerequisite technique of the present invention, will be explained below. GMPLS is a technique that expands the MPLS technique standardized in the IP network so as to be applicable to other fields, such as TDM layers and optical layers, in order to integrate the topologies of SONET and WDM or to set paths in a dynamic manner.

The goal of the GMPLS is to prevent network management cost from increasing even if the network scale expands, by allowing each node to autonomously manage the network topology, in place of centralized management of detailed network topology at the network management system (NMS).

Instead of issuing instructions from the network management system (NMS) to change the configuration of the respective communication nodes, the end node of a path is requested to set a new path. This arrangement can reduce time required to set up a network in response to a user's request.

The GMPLS also aims at improving the efficiency of network control, as well as realizing interoperability with other vender apparatuses. This is achieved by expanding the control network of the MPLS standardized in the IP network so as to be applicable to carrier networks in common, instead of producing an independent control form for each of the carrier networks (of core communication providers).

FIG. 1 illustrates an example of a proposed communications network system, which includes a management plane (i.e., a management network) 10, a control plane (i.e., a control network) 20, and a data plane 30 (which is a user data transmission network).

The management plane 10 implements management of apparatuses, networks, and services, and regulates the interface with the user (or the network operator).

The control plane 20 is comprised of control nodes 21, 22, and 23, between which routing information is transmitted to establish the optimum path to the destination. Each of the control nodes 21, 22, and 23 corresponds to one of the communication nodes 31, 32 and 33 placed on the data plane 30.

The data plane 30 is comprised of the communication nodes 31, 32, and 33, each of which switches data traffic according to the instruction from the associated control node (i.e., one of the control nodes 21, 22, and 23) to transmit user data to the destination efficiently.

Each pair of the control node and the communication node constitutes a signaling-based communication apparatus. Namely, the control node 21 and the communication node 31 comprise a signaling-based communication apparatus. The same applies to the pair of control node 22 and communication node 32, and the pair of control node 23 and communication node 33.

In this communications network, the configuration of each communication apparatus can be varied under the signaling control, and the communication apparatuses are mutually connected via the control plane 20. All the communication nodes 31-33 are connected to the management plane 10 via the control plane 20 to receive an instruction for changing the configuration from the management plane 10. The topology and the protocol of the management plane 10 generally differ from those of the control plane 20.

However, in reality, it is difficult to replace all the non-signaling-based communications apparatuses at once with signaling-based communication apparatuses in order to introduce the above-described signaling control technique in the communications network. This is mainly because of economic reasons and practical reasons pertaining to time-consuming construction. If non-signaling-based communication apparatuses remain as a part of the communications network, signaling messages can not reach the communication nodes of such non-signaling-based communication apparatuses because these communication nodes are not connected to the control plane 20 due to not having associated control nodes.

On the other hand, in the conventional signaling-control-based network, such as the IP network, the control message transmission network and the user data transmission network are the same, and therefore, all the communication nodes are connected under the same protocol. However, if the network conditions of the prerequisite networks greatly differ from each other, and if the control plane 20 and the data plane 30 are constructed independently from each other, then it is difficult for the topology information collecting protocol of the control plane 20 to grasp the existence of non-signaling-based communication apparatuses. This results in a contradiction between the collected topology information and the requested path setting information. In other words, it is not possible for the conventional IP network to adjust the configuration for the purpose of setting a new path, using only data transmission on the control plane 20.

SUMMARY OF THE INVENTION

The present invention was conceived to overcome the above-described problem, and it is an object of the invention to provide a signaling control method, and a signaling-based communication apparatus, which are capable of establishing a user data transmission path in the user data transmission network under signaling control even if the communications network includes both signaling-based communication apparatuses and non-signaling-based communication apparatuses.

In one aspect of the invention, a signaling control method for controlling a signaling process in a communication network system comprised of a management network, a control network, and a user data transmission network is provided. The management network includes a network management system, the control network includes a plurality of control nodes connected to the network management system for conducting signaling control, and the user data transmission network includes a plurality of communication nodes for transmitting user data.

The communication nodes include one or more first type communication nodes and one or more second type communication nodes. The method comprises the following steps:

(a) setting one or more singling-based communication apparatuses in the communications network system, each consisting of one of the control nodes and one of the first type communication nodes, said one of the first type communication nodes being connected to the associated control node and the management network;

(b) setting a non-signaling-based communication apparatus consisting of one of the second type communication nodes in the communications network system, the second type communication nodes being connected to the management network;

(c) causing the network management system to change a configuration of the second type communication node of the non-signaling-based communication apparatus when establishment of a path extending through the non-signaling-based communication apparatus is requested in the user data transmission network; and (d) causing the control nodes of the signaling-based communication apparatuses to successively transmit a signaling message along the requested path in the control network so as to change the configurations of the second type communication nodes.

With this method, a user data transmission path can be established in the user data transmission network under the signaling control, even if the communication network system includes both the signaling-based communication apparatuses and non-signaling-based communication apparatuses.

The second type communication nodes may constitute a domain that includes only the non-signaling-based communication apparatuses. In this case, the method further comprises the steps of causing the network management system to change the configurations of the second type communication nodes of the non-signaling-based communication apparatuses located along the requested path in the domain when establishment of a path extending through the domain is requested.

The network management system calculates a path in response to a path setting request, and upon the calculation, the network management system changes the configurations of the communication nodes of the non-signaling-based communication apparatus located along the calculated path.

Alternatively, each time the signaling-based communication apparatus that is located immediately before the non-signaling-based communication apparatus along the calculated path receives a signaling message, the control node of this signaling-based communication apparatus may request the network management system to change the configuration of the adjacent non-signaling-based communication apparatus.

In another aspect of the invention, a signaling-based communication apparatus furnished in a communications network system comprised of a management network, a control network, and a user data transmission network is provided. The signaling-based communication apparatus comprises a control node belonging to the control network and connected to the management network, and a communication node belonging to the user data transmission network and connected to the control node and the management network. The control node has an adjacent-node information storage that stores adjacent node information representing whether a next communication node located adjacent to this signaling-based communication apparatus constitutes a non-signaling-based communication apparatus in the communications network system. The control node also has a signaling message receiving unit that receives a signaling message containing a request for establishing a path, a signaling processing unit that carries out a procedure on behalf of the non-signaling-based communication apparatus, if the next communication node constitutes the non-signaling-based communication apparatus, when the requested path extends through the non-signaling-based communication apparatus, and a signaling message transmission unit that transmits the signaling message to a second control node of a next signaling-based communication apparatus located adjacent to the non-signaling-based communication apparatus.

In one example of the signaling-based communication apparatus, when the requested path extends through the non-signaling-based communication apparatus, the signaling processing unit requests a network management system furnished in the management network to change the configuration of the next communication node of the non-signaling-based communication apparatus.

With this signaling-based communication apparatus, a user data transmission path can be established in the user data transmission network, even if the communications network system includes a non-signaling-based communication apparatus that is not designed so as to be suitable to signaling control.

BRIEF DESCRIPTION OF THE DRAWINGS

Other objects, features, and advantages of the present invention will become more apparent from the following detailed description when read in conjunction with the accompanying drawings, in which:

FIG. 3 illustrates an example of specific route information of the respective communication nodes;

FIG. 4 illustrates an example of the adjacent node status table held in each communication node connected to the control plane;

DETAILED DESCRIPTION OF THE PREFERRED EMBODIMENTS

The preferred embodiments of the present invention will now be described in detail, with reference to the attached drawings.

Figure 1:
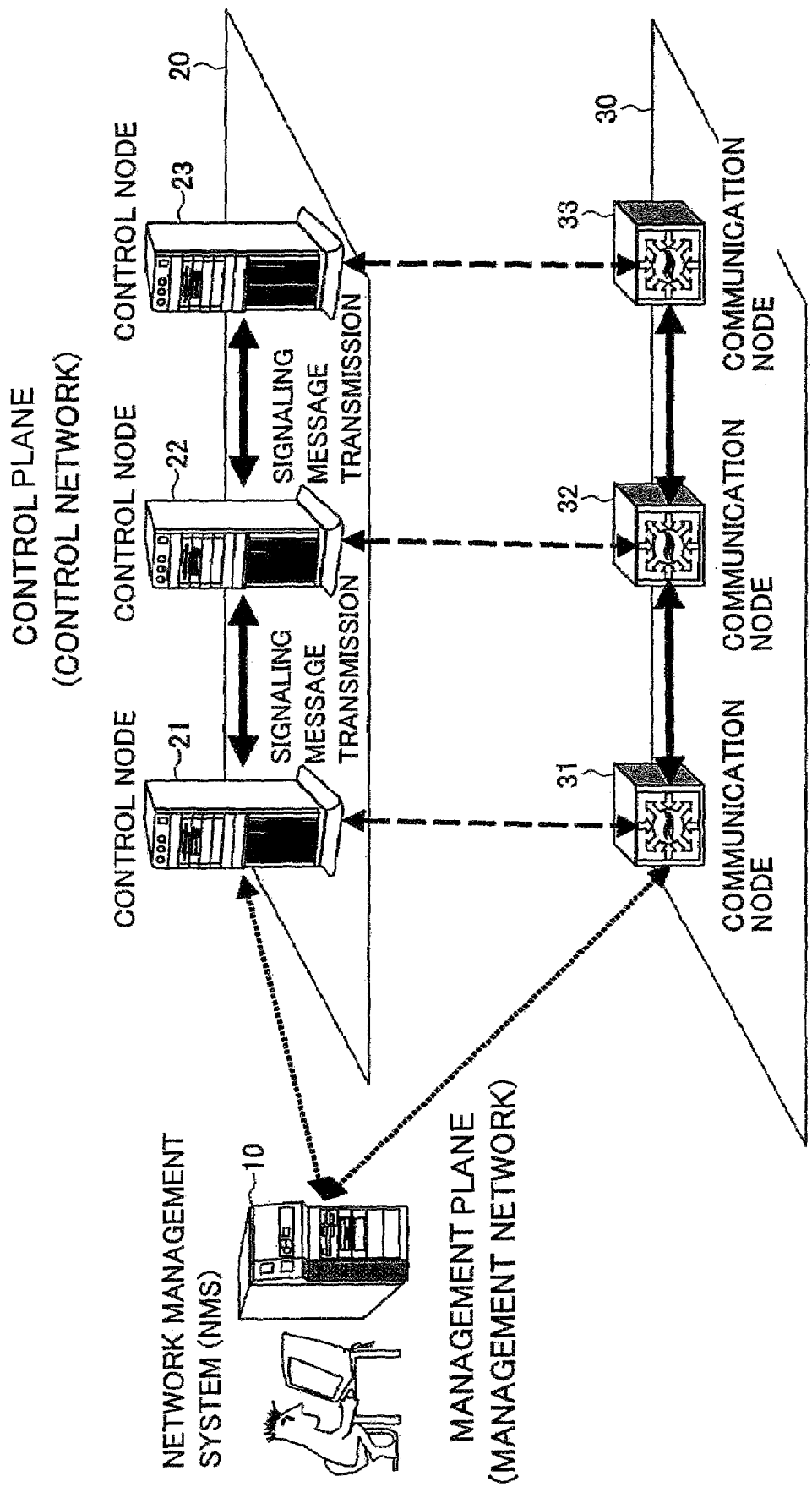
FIG. 1 illustrates an example of the configuration of a signaling-based communications network system.
Figure 2:
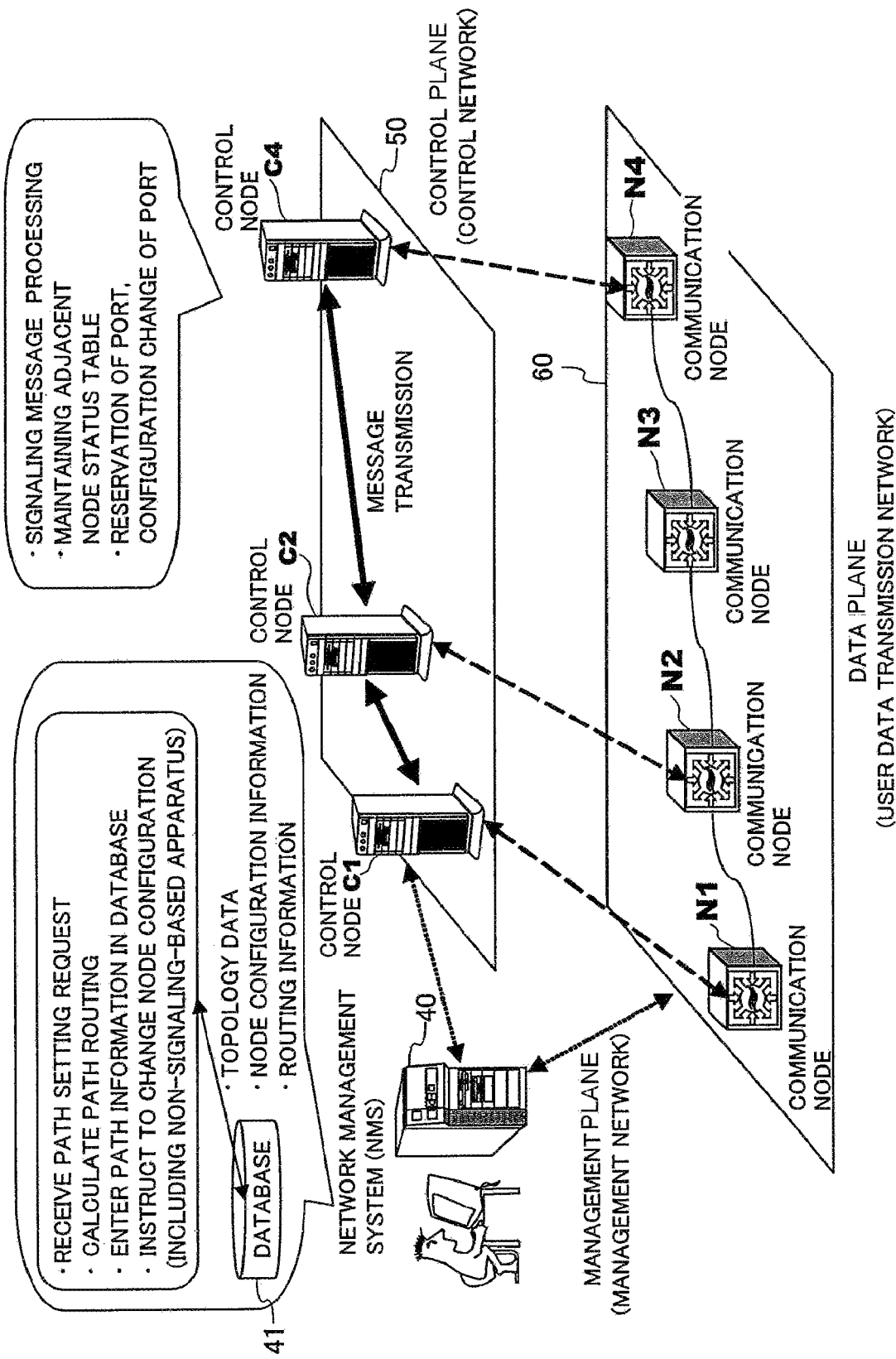
FIG. 2 illustrates the configuration of the communications network system according to the first embodiment of the invention.

FIG. 2 illustrates the configuration of the communications network system according to the first embodiment of the invention. The communication network system includes a management plane (i.e., a management network) 40, a control plane (i.e., a control network) 50, and a data plane 60 that is a user data transmission network.

The management plane 40 has a network management system (NMS). The management plane 40 is connected to the control plane 50 and the data plane 60 to manage those apparatuses, networks, and services involved in the network system. The management plane 40 also regulates the interface with user (or the network operator).

The control plane 50 is comprised of control nodes C1, C2, and C4, between which routing information is transmitted to establish the optimum path to the destination. Each of the control nodes C1, C2, and C4 is associated with a counterpart communication node so as to construct a signaling-based communication apparatus.

The data plane 60 is comprised of the communication nodes N1, N2, N3, and N4, which switch data traffic according to the instructions from the associated control nodes C1, C2, and C3 to transmit user data to the destination efficiently.

The control node C1 and the communication node N1 comprise a signaling-based communication apparatus. The control node C2 and the communication node N2 also comprise a signaling-based communication apparatus, and the same applies to the control node C4 and the communication node N4. The communication node N3 is a non-signaling-based communication apparatus.

In FIG. 2, the network management system (NMS) is connected to the communication nodes N1, N2, N3 and N4 by means of the management plane 40. The network management system (NMS) receives a path setting request from another communications network, and determines (or calculates) an end-to-end path connecting between the originating node and the terminating node designated by the request, with reference to the node configuration information stored in the database 41. If the path setting request designates a path from the communication node N1 to the communication node N4, then the network management system (NMS) directs the communication node N1 to change the configuration by means of signaling.

When directing the configuration change, the network management system (NMS) produces specific routing information. FIG. 3 illustrates an example of specific routing information produced when a path from N1 to N4 is calculated. In the example, the node identifiers (IDs) N1 through N4 are arranged in order of hop in the calculated path.

Each line of data includes an uplink port and a downlink port designated for the configuration change, with the associated node identifier. The uplink denotes the stream from the originating communication node N1 to the terminating communication node N4, and the downlink denotes the stream from the terminating communication node N4 to the originating communication node N1.

The control nodes C1, C2, and C4 in the control plane 50 are connected to the communication nodes N1, N2, and N4, respectively, based on signaling control. The control plane 50 does not include a control node for the communication node N3 that is not a signaling-based node.

When the instruction for configuration change is provided by the network management system (NMS) through the signaling control, the communication node N1 changes the configuration pertaining to the communication port designated in the specific routing information, and transmits a control message to the communication node N2, which is the next hop in the path indicated by the specific routing information.

Similarly, the communication node N2 makes a change to its configuration with respect to the communication port designated in the specific routing information. In changing the configuration, the communication node N2 refers to the adjacent node status table, an example of which is illustrated in FIG. 4, and recognizes that the next hop, that is, the communication node N3 is non-signaling-based. The communication node N2 also recognizes from the specific routing information (FIG. 3) and the adjacent node status table (FIG. 4) that the communication node N4 located next to N3 is available as a next hop for receiving the control message. Accordingly, the communication node N2 transmits the control message to the communication node N4.

FIG. 4 illustrates an example of the adjacent node status table referred to by the communication node N2. The adjacent node status table is maintained in, for example, the corresponding control node C2, or alternatively, in the communication node N2. In the former case, the communication node N2 refers to the adjacent node status table held in the associated control node C2 via the control plane 50. In this example, the center column represents whether or not the adjacent communication nodes (i.e., N1 and N3) are signaling-control-based. Since the communication node N3 is not signaling-control-based, alternative adjacent available nodes capable of receiving the control message are listed in the data line of non-signaling-based communication node N3. In the example shown in FIG. 4, communication node N4 is listed as an available node to which the control message can be transmitted.

Then, upon receiving the control message, the communication node N4 changes its configuration with respect to the communication port designated in the specific routing information. As to the non-signaling-based communication node N3, the network management system (NMS) changes the configuration of N3 with respect to the specified communication port via the management plane 40, whereby, the requested path extending from the communication node N1 to the communication node N4 can be established.

Figure 5:
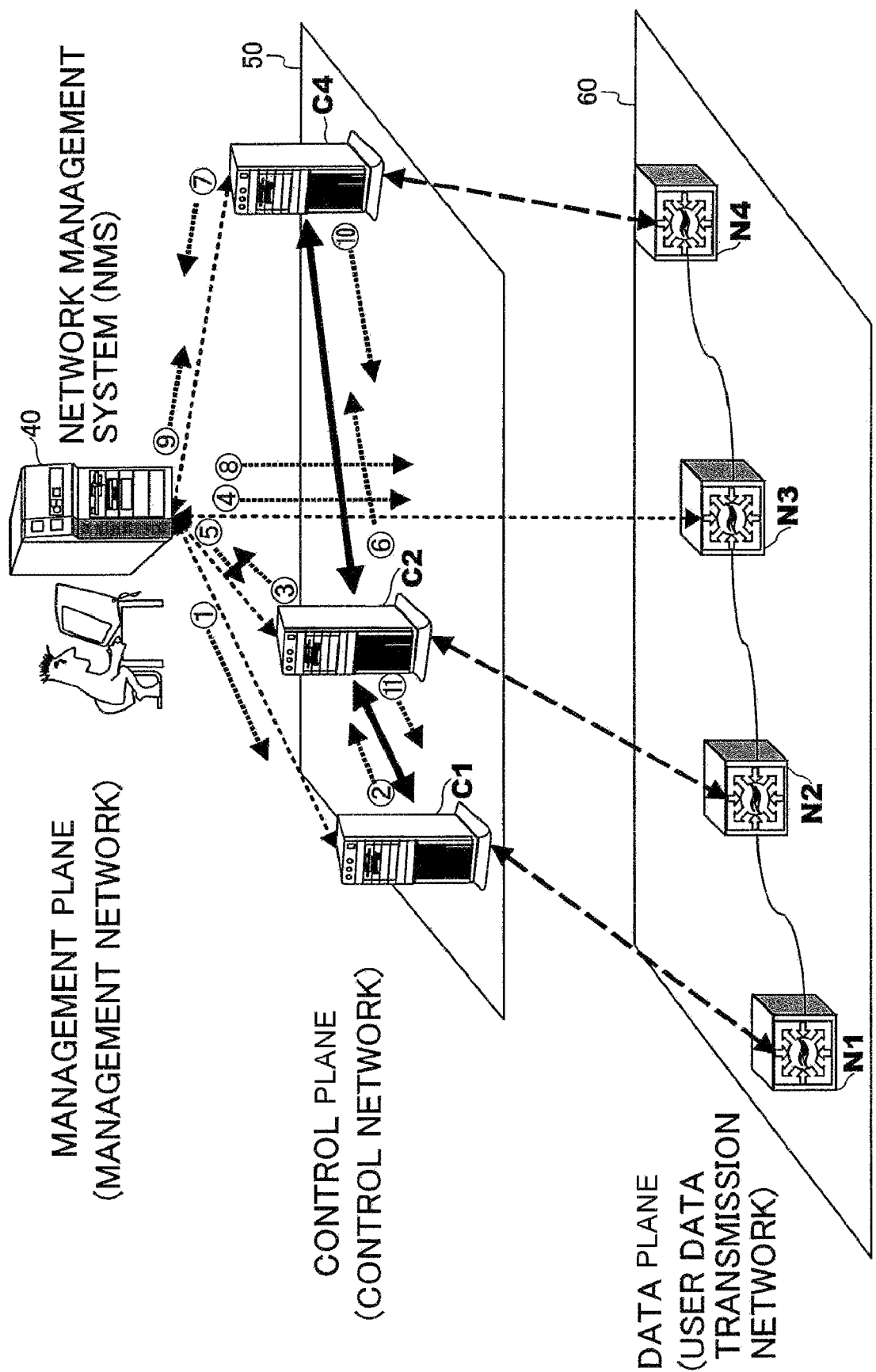
FIG. 5 is a diagram used to explain the signaling control according to the first embodiment.

FIG. 5 illustrates the procedure of the configuration change for setting a path according to the first embodiment. In the first embodiment, a signaling-based communication apparatus located adjacent to a non-signaling-based communication apparatus requests the network management system (NMS) to change the configuration of the non-signaling-based communication apparatus. In the example, a technique of GMPLS, which is a signaling protocol currently standardized in the IETF (Internet Engineering Task Force), is employed.

Procedure 1: The network management system (NMS) calculates a path N1–N2–N3–N4 extending through these communication nodes in this order, and transmits a path message via the management plane 40 to the control node C1 that controls the originating communication node N1. The path message is a signaling message requesting path setting, which contains calculated specific routing information.

This procedure is indicated by the dotted arrow (1) in FIG. 5.

Procedure 2: The control node C1 reserves the port designated in the specific routing information for the communication node N1, and then deletes the data line of N1 from the specific routing information. Then, the control node C1 transmits the path message to the control node C2 via the control plane 50. This procedure is indicated by the dotted arrow (2).

Procedure 3: The control node C2 reserves the designated port for the communication node N2, and deletes the data line of N2 from the specific routing information. The control node C2 recognizes from the adjacent node status table that the next communication node N3 is a non-signaling-based apparatus, and accordingly, it requests the network management system (NMS) to reserve the port for communication node N3, based on the information about the communication node N3 contained in the path message. This procedure is indicated by the dotted arrow (3).

Procedure 4: Based on the request from the control node C2 and the port information of the communication node N3, the network management system (NMS) reserves the designated port of the communication node N3 via the management plane 40, as indicated by the dotted arrow (4).

Procedure 5: The network management system (NMS) informs the control node C2 of the accomplishment of the requested procedure, as indicated by the dotted arrow (5).

Procedure 6: Upon receiving the accomplishment of the port reservation for the communication node N3, the control node C2 deletes the data line of N3 from the specific routing information, and transmits the path message to the control node C4 via the control plane 50. This procedure is indicated by the dotted arrow (6).

Procedure 7: The control node C4 recognizes from the specific routing information that the control node C4 is the terminating node. Accordingly, the control node C4 cross-connects the designated port by changing the configuration, and produces a Resv message containing the configuration information. The control node C4 also recognizes from the adjacent node status table that the communication node N3 is a non-signaling-based apparatus. Accordingly, the communication node C4 requests the network management system (NMS) to change the port configuration of the communication node N3, based on the information about the communication node N3 contained in the Resv message, as indicated by the dotted arrow (7).

Procedure 8: Based on the request from the control node C4 and the port reservation state of the communication node N3, the network management system (NMS) changes the configuration of the port of the communication node N3 via the management plane 40, as indicated by the dotted arrow (8).

Procedure 9: The network management system (NMS) informs the control node C4 of the accomplishment of the changing the port configuration of N3, as indicated by the dotted arrow (9).

Procedure 10: Upon receiving the accomplishment of the port configuration change of the communication node N3, the control node C4 writes the configuration information about the communication node N3 into the Resv message. Then, the control node C4 transmits the Resv message to the control node C2 via the control plane 50, as indicated by the dotted arrow (10).

Procedure 11: The control node C2 changes the configuration of the reserved port, and transmits the Resv message containing the configuration information to the control node C1 via the control plane 50, as indicated by the dotted arrow (11). The control node C1 changes the reserved port. The control node C1 recognizes that this node is the originating node, and starts transmitting user data using the established path.

Figure 6:
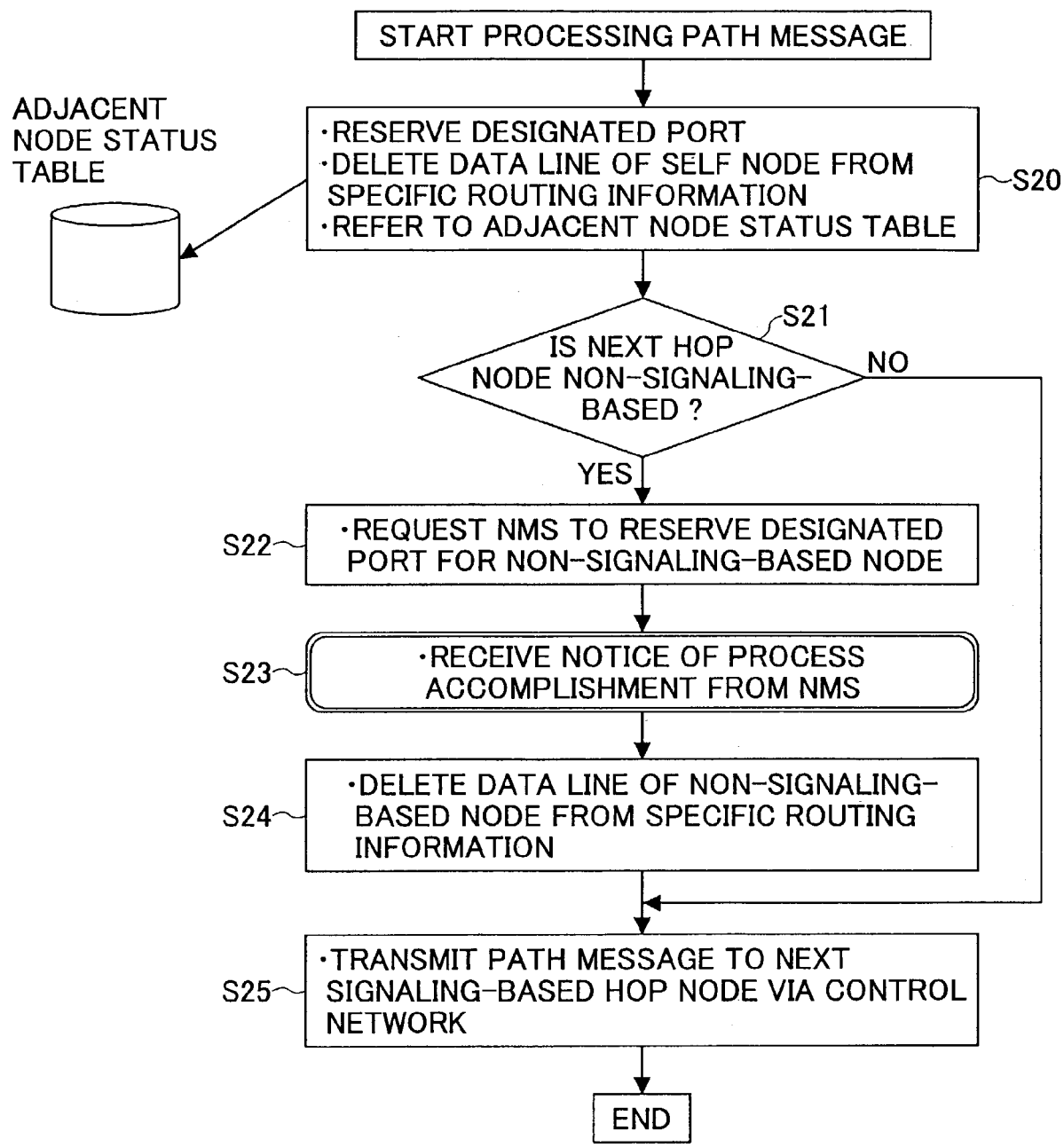
FIG. 6 is a flowchart showing the operations executed when a path message for reserving a communication port to set a path is received at a signaling-based communication apparatus located adjacent to a non-signaling-based communication apparatus.

FIG. 6 is a flowchart showing the operations carried out by a signaling-based communication apparatus (that is, the combination of N2 and C2 in this example) located adjacent to a non-signaling-based communication apparatus (N3 in this example) when receiving a path message to reserve a communication port for establishing a path.

Upon receiving a path message, the signaling-based communication apparatus starts processing the path message. In step S20, the signaling-based communication apparatus reserves the port designated in the specific routing information for its own. Then, the signaling-based communication apparatus deletes the data line of this communication apparatus itself from the specific routing information, and refers to the adjacent node status table (show in FIG. 4).

In step S21, the signaling-based communication apparatus determines whether the next hop node is a non-signaling-based communication apparatus. If the next hop is non-signaling-based (YES in step S21), the signaling-based communication apparatus requests the network management system (NMS) to reserve the designated port for the non-signaling-based communication apparatus in step S22.

In step S23, the signaling-based communication apparatus receives a notice of accomplishing the port reservation process from the network management system (NMS), In step S24, the signaling-based communication apparatus deletes the data line of the non-signaling-based communication apparatus (e.g., data line of N3 in FIG. 3) from the specific routing information, on behalf of the non-signaling-based communication apparatus.

Then, in step S25, the signaling-based communication apparatus transmits the path message to the next signaling-based hop node located adjacent to the non-signaling-based communication apparatus. Then, the process terminates.

In this manner, even if the communication network is comprised of both signaling-based communication apparatuses and non-signaling-based communication apparatuses, a user data transmission path can be established using the conventional technique, without replacing the non-signaling-based communication apparatus with a signaling-based apparatus.

Figure 7:
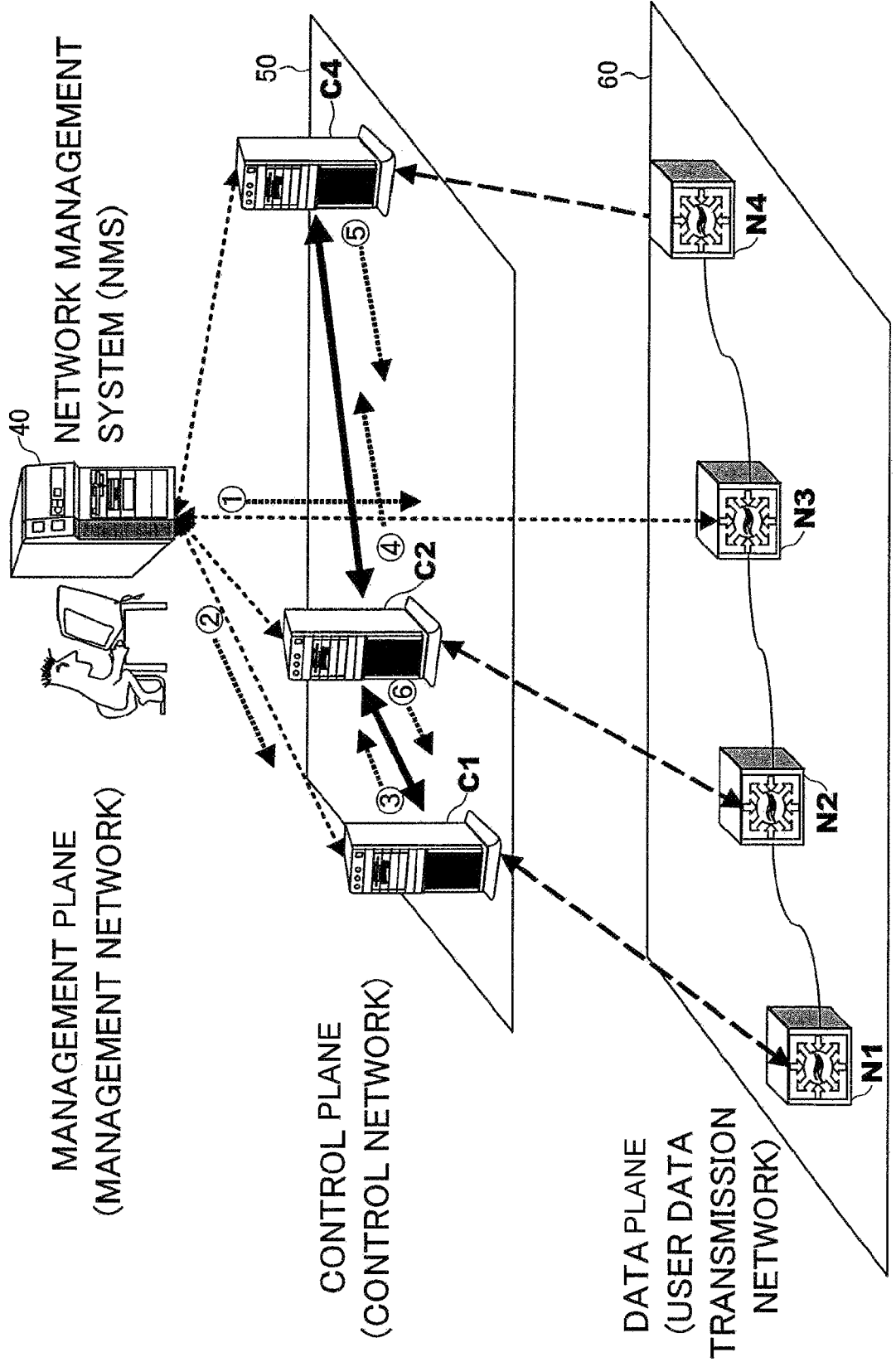
FIG. 7 is a diagram used to explain a modification of the signaling control carried out in the system shown in FIG. 2.

FIG. 7 illustrates a modification of the procedure of the configuration change carried out in the communications network system shown in FIG. 2. In the modification, the network management system (NMS) changes the configuration of the non-signaling-based communication apparatus after having calculated a path route. The signaling protocol of GMPLS is used, as in the first embodiment.

Procedure 1: The network management system (NMS) calculates a path N1–N2–N3–N4 extending through these communication nodes in this order, and produces specific routing information. Then, the network management system (NMS) reserves the port for the communication node N3, and changes the port configuration of N3 via the management plane 40, based on the specific routing information and the port information of the communication node N3 stored in advance. This procedure is indicated by the dotted arrow (1) in FIG. 7.

Procedure 2: The network management system (NMS) transmits a path message via the management plane 40 to the control node C1 furnished corresponding to the originating communication node N1, requesting path setting, as indicated by the dotted arrow (2). The path message is a signaling message containing the specific routing information.

Procedure 3: The control node C1 reserves the port designated for the communication node N1, and then deletes the data line of N1 from the specific routing information. Then, the control node C1 transmits the path message to the control node C2 via the control plane 50, as indicated by the dotted arrow (3).

Procedure 4: The control node C2 reserves the designated port for the communication node N2, and deletes the data line of N2 from the specific routing information. The control node C2 recognizes from the adjacent node status table that the next communication node N3 is a non-signaling-based apparatus, and deletes the data line of N3 from the specific routing information, on behalf of the communication node N3. Then, the control node C2 transmits the path message to the control node C4 via the control plane 50, as indicated by the dotted arrow (4).

Procedure 5: The control node C4 recognizes from the specific routing information that this node is the terminating node, and accordingly, cross-connects the designated port by changing the configuration, while producing a Resv message containing the configuration information. The control node C4 also recognizes from the adjacent node status table that the communication node N3 is a non-signaling-based apparatus. The communication node C4 writes the configuration information of the communication node N3 into the Resv message, and transmits the Resv message to the control node C2 via the control plane 50, as indicated by the dotted arrow (5).

Procedure 6: The control node C2 changes the configuration of the reserved port, and transmits the Resv message containing the configuration information to the control node C1 via the control plane 50, as indicated by the dotted arrow (6). The control node C1 changes the configuration of the reserved port. The control node C1 also recognizes that this node is the originating node, and starts transmitting user data using the established path.

This modification can achieve the same effect as in the first example explained with reference to FIG. 5. Since, in the modification, data transmission between the network management system (NMS) and the signaling-based communication apparatus adjacent to the non-signaling-based communication apparatus can be eliminated, the requested path can be established more efficiently.

Figure 8:
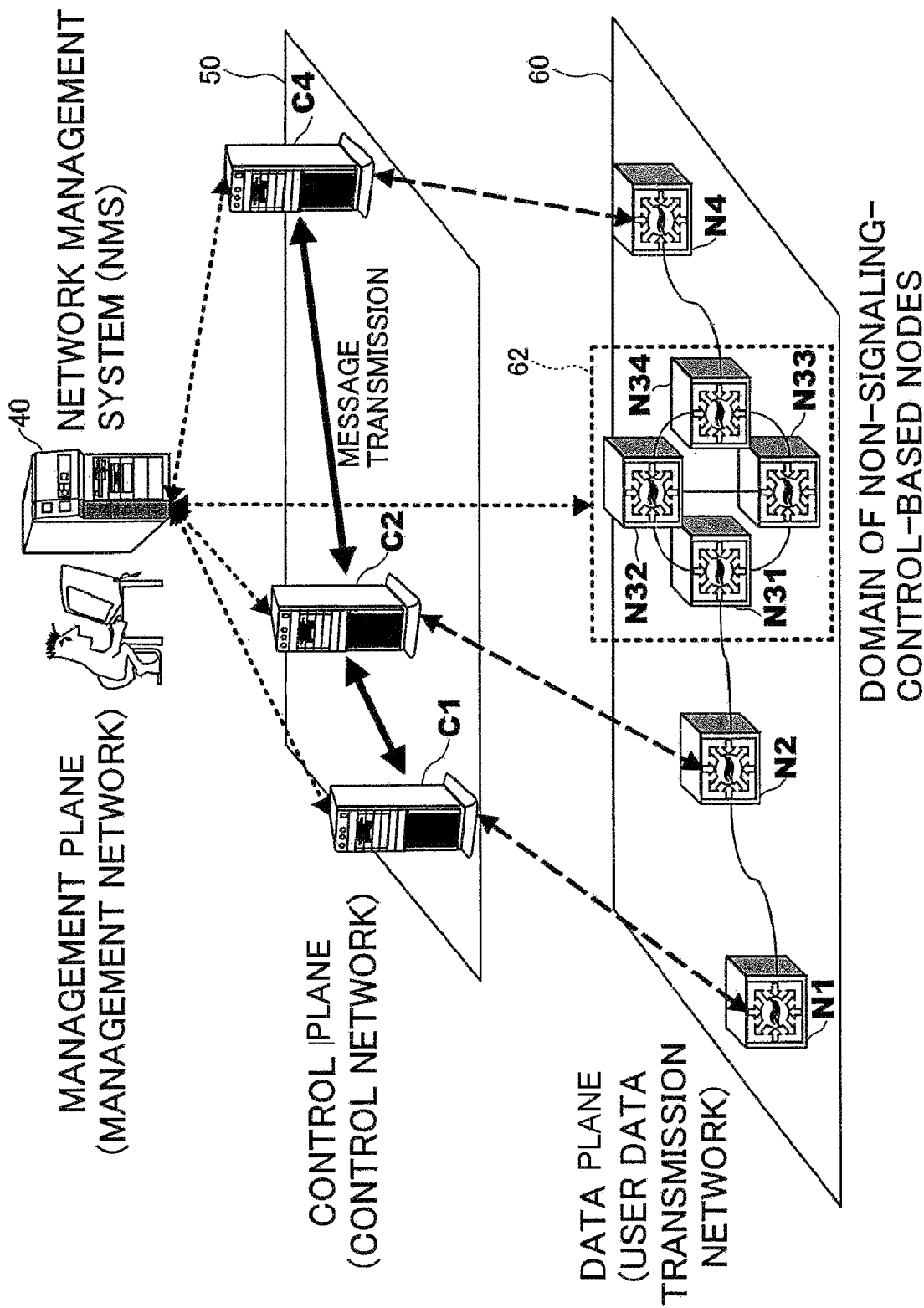
FIG. 8 illustrates the configuration of the communications network system according to the second embodiment of the invention.

FIG. 8 illustrates the configuration of the communication network system according to the second embodiment of the invention. In the second embodiment, a domain 62 consisting of non-signaling-based communication nodes disconnected from the control plane 50 exists in the data plane 60.

The network management system (NMS) is connected to the communication nodes N1, N2, N31, N32, N33, N34, and N4 via the management plane 40. The network management system (NMS) receives a path setting request from another communication network, and calculates an end-to-end path connecting between the requested originating node and terminating node, with reference to the node configuration information stored in the database 41 (see FIG. 2).

For example, in response to a request for communication path from communication node N1 to communication node N4, then the network management system (NMS) calculates a path of, for example, N1–N2–N31–N32–N34–N4 extending through these communication nodes in this order. The network management system (NMS) transmits this specific routing information to the communication node N1, which is the originating node of the path, to instruct a configuration change through signaling control.

The control plane 50 is connected to only signaling-control-based communication nodes N1, N2, and N4, while the domain 62 consisting of non-signaling-control-based communication nodes N31, N32, N33, and N34 is not connected to the control plane 50.

Based on the instruction from the network management system (NMS) for the configuration change through signaling control, the communication node N1 changes the configuration as to the designated communication port, and transmits a control message to the next hop, that is, the communication node N2.

Similarly, the communication node N2 changes the configuration of the designated communication port. The communication node N2 refers to the adjacent node status table shown in FIG. 4, and recognizes that the next hop (i.e., the communication node N31) resides in the non-signaling-based domain 62. The communication node N2 also recognizes that the communication node N4, which is located adjacent to the non-signaling-based domain 62, is available for receiving the control message, from the specific routing information and the adjacent node status table. Consequently, the communication node N4 transmits the control message to the communication node N4.

The communication node N4 changes the configuration with respect to the designated communication port. On the other hand, the network management system (NMS) changes the configurations of the ports of the communication nodes N31, N32, and N34 inside the non-signaling-based domain 62, via the management plane 40. In this manner, the requested path extending from the communication node N1 to communication node N4 is established in the user data transmission network.

Figure 9:
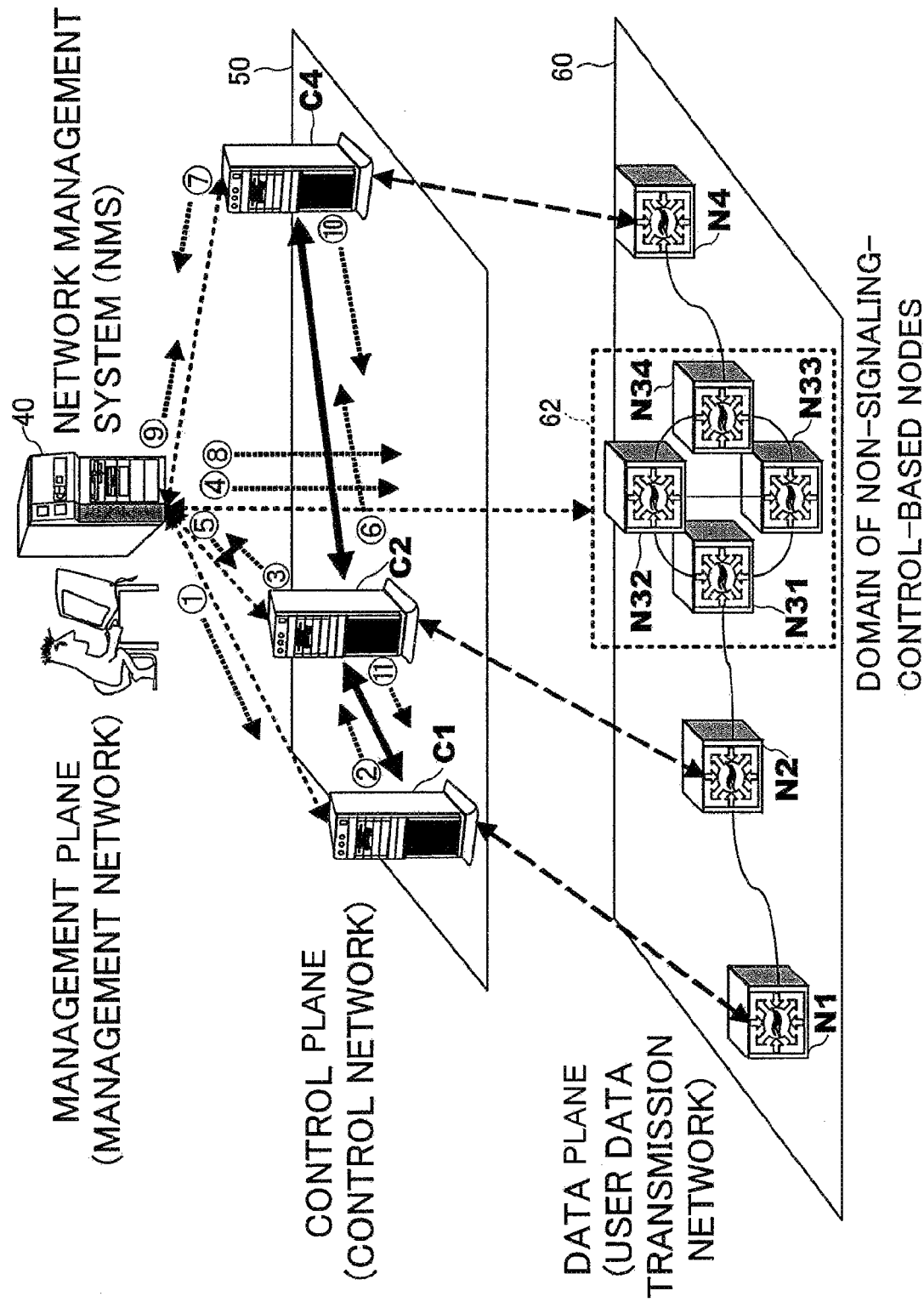
FIG. 9 is a diagram used to explain the procedure of the signaling control carried out in the communications network system shown in FIG. 8 according to the second embodiment of the invention.

FIG. 9 illustrates the procedure of the signaling control carried out in the second embodiment. In the second embodiment, the signaling-based communication apparatus located adjacent to the domain 62 consisting of a set of non-signaling-based communication nodes requests the network management system (NMS) to change the configurations of those communication nodes inside the domain 62. The signaling protocol of GMPLS is employed in the procedure, as in the previous embodiment.

Procedure 1: The network management system (NMS) calculates a path N1–N2–N31–N32–N34–N4 extending through these communication nodes in this order, and transmits a path message via the management plane 40 to the control node C1 corresponding to the originating communication node N1. The path message is a signaling message requesting path setting, which contains calculated specific routing information. This procedure is indicated by the dotted arrow (1) in FIG. 9.

Procedure 2: The control node C1 reserves the port designated in the specific routing information for the communication node N1, and then deletes the data line of N1 from the specific routing information. Then, the control node C1 transmits the path message to the control node C2 via the control plane 50, as indicated by the dotted arrow (2).

Procedure 3: The control node C2 reserves the designated port for the communication node N2, and deletes the data line of N2 from the specific routing information. The control node C2 recognizes from the adjacent node status table that the next communication node N31 is a non-signaling-based apparatus included in the domain 62, and that the next signaling-based communication apparatus adjacent to the domain 62 is communication node N4. Accordingly, the communication node C2 requests the network management system (NMS) to reserve the ports for communication nodes N31, N32, and N34, based on the specific routing information about the communication nodes N31, N32, and N34 contained in the path message. This procedure is indicated by the dotted arrow (3).

Procedure 4: Based on the request from the control node C2 and the port information of the communication nodes N31, N32, and N34, the network management system (NMS) reserves the designated ports for the communication nodes N31, N32, and N34 via the management plane 40, as indicated by the dotted arrow (4).

Procedure 5: The network management system (NMS) informs the control node C2 of the accomplishment of the requested procedure, as indicated by the dotted arrow (5).

Procedure 6: Upon receiving the accomplishment of the port reservation for the communication nodes N31, N32, and N34, the control node C2 deletes the data lines of N31, N32, and N34 from the specific routing information, and transmits the path message to the control node C4 via the control plane 50, as indicated by the dotted arrow (6).

Procedure 7: The control node C4 recognizes from the specific routing information that the control node C4 is the terminating node. Accordingly, the control node C4 cross-connects the designated port by changing the configuration, and produces a Resv message containing the configuration information. The control node C4 also recognizes from the adjacent node status table that the communication node N31 is a non-signaling-based apparatus residing in the domain 62. Accordingly, the communication node C4 requests the network management system (NMS) to change the port configurations of the communication node N31, N32, and N34, based on the information about these communication nodes N31, N32, and N34 contained in the Resv message, as indicated by the dotted arrow (7).

Procedure 8: Based on the request from the control node C4 and the port reservation states of the communication nodes N31, N32, and N34, the network management system (NMS) changes the configurations of the ports of the communication nodes N31, N32, and N34 via the management plane 40, as indicated by the dotted arrow (8).

Procedure 9: The network management system (NMS) informs the control node C4 of the accomplishment of the changing the port configurations of N31, N32, and N34, as indicated by the dotted arrow (9).

Procedure 10: Upon receiving the accomplishment of the changes in port configuration of the communication nodes N31, N32, and N34, the control node C4 writes the configuration information about the communication nodes N31, N32, and N34 into the Resv message. Then, the control node C4 transmits the Resv message to the control node C2 via the control plane 50, as indicated by the dotted arrow (10).

Procedure 11: The control node C2 changes the configuration of the reserved port, and transmits the Resv message containing the configuration information to the control node C1 via the control plane 50, as indicated by the dotted arrow (11). The control node C1 changes the reserved port. The control node C1 recognizes that this node is the originating node, and starts transmitting user data using the established path.

In the second embodiment, even if the communication network includes a domain consisting of non-signaling-based communication apparatuses, other than signaling-based communication apparatuses, a communication path can be established in the user data transmission network in an efficient manner.

Figure 10:
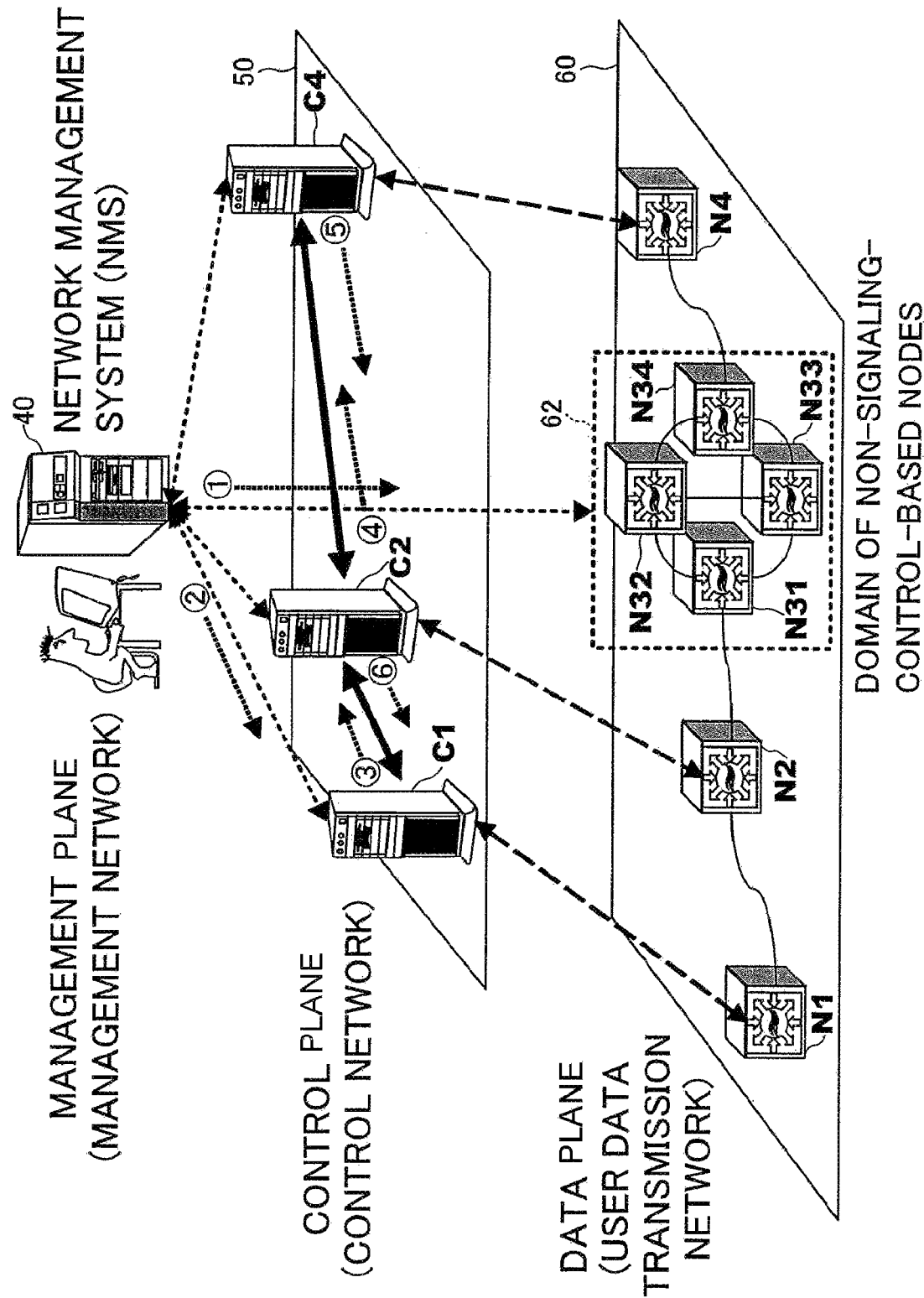
FIG. 10 illustrates a modification of the signaling control shown in FIG. 9.

FIG. 10 illustrates a modification of the procedure of signaling control in the second embodiment. In the modification, the network management system (NMS) changes the configuration of the domain 62, which is comprised of a set of non-signaling-based communication apparatus, after having calculated a path route. The signaling protocol of GMPLS is used, as in the previous embodiments.

Procedure 1: The network management system (NMS) calculates a path N1–N2–N31–N32–N34–N4 extending through these communication nodes in this order, and produces specific routing information. Then, the network management system (NMS) reserves the ports for the communication nodes through N31–N32–N34, and changes the port configuration of N31–N32–34 via the management plane 40, based on the specific routing information and the port information about the communication nodes N31–N32–N34. This procedure is indicated by the dotted arrow (1) in FIG. 10.

Procedure 2: The network management system (NMS) transmits a path message via the management plane 40 to the control node C1 furnished corresponding to the originating communication node N1, requesting path setting, as indicated by the dotted arrow (2). The path message is a signaling message containing the specific routing information.

Procedure 3: The control node C1 reserves the port designated for the communication node N1, and then deletes the data line of N1 from the specific routing information. Then, the control node C1 transmits the path message to the control node C2 via the control plane 50, as indicated by the dotted arrow (3).

Procedure 4: The control node C2 reserves the designated port for the communication node N2, and deletes the data line of N2 from the specific routing information. The control node C2 recognizes from the adjacent node status table that the next communication node N31 is included in the domain 62 consisting of non-signaling-based apparatuses, and that the next signaling-based communication apparatus adjacent to the domain 62 is communication node N4. Based on this information, the control node C2 deletes the data lines regarding the communication nodes of N31–N32–N34 from the specific routing information, and transmits the path message to the control node C4 via the control plane 50, as indicated by the dotted arrow (4).

Procedure 5: The control node C4 recognizes from the specific routing information that this node is the terminating node, and accordingly, cross-connects the designated port by changing the configuration, while producing a Resv message containing the configuration information.

The control node C4 also recognizes from the adjacent node status table that the communication node N31 is a non-signaling-based apparatus included in the domain 62, and that the next signaling-based communication apparatus adjacent to the domain 62 is communication node N2. Based on this information, the communication node C4 writes the configuration information about the communication nodes N31–N32–N34 into the Resv message, and transmits the Resv message to the control node C2 via the control plane 50, as indicated by the dotted arrow (5).

Procedure 6: The control node C2 changes the configuration of the reserved port, and transmits the Resv message containing the configuration information to the control node C1 via the control plane 50, as indicated by the dotted arrow (6). The control node C1 changes the configuration of the reserved port. The control node C1 also recognizes that this node is the originating node, and starts transmitting user data using the established path.

In this manner, even if the communications network system includes a domain consisting of a set of non-signaling-based communications apparatuses among signaling-based communication apparatuses, a use data transmission path can be established more efficiently by signaling control, while eliminating communication between the network management system (NMS) and the signaling-based communication apparatus adjacent to the domain 62.

Figure 11:
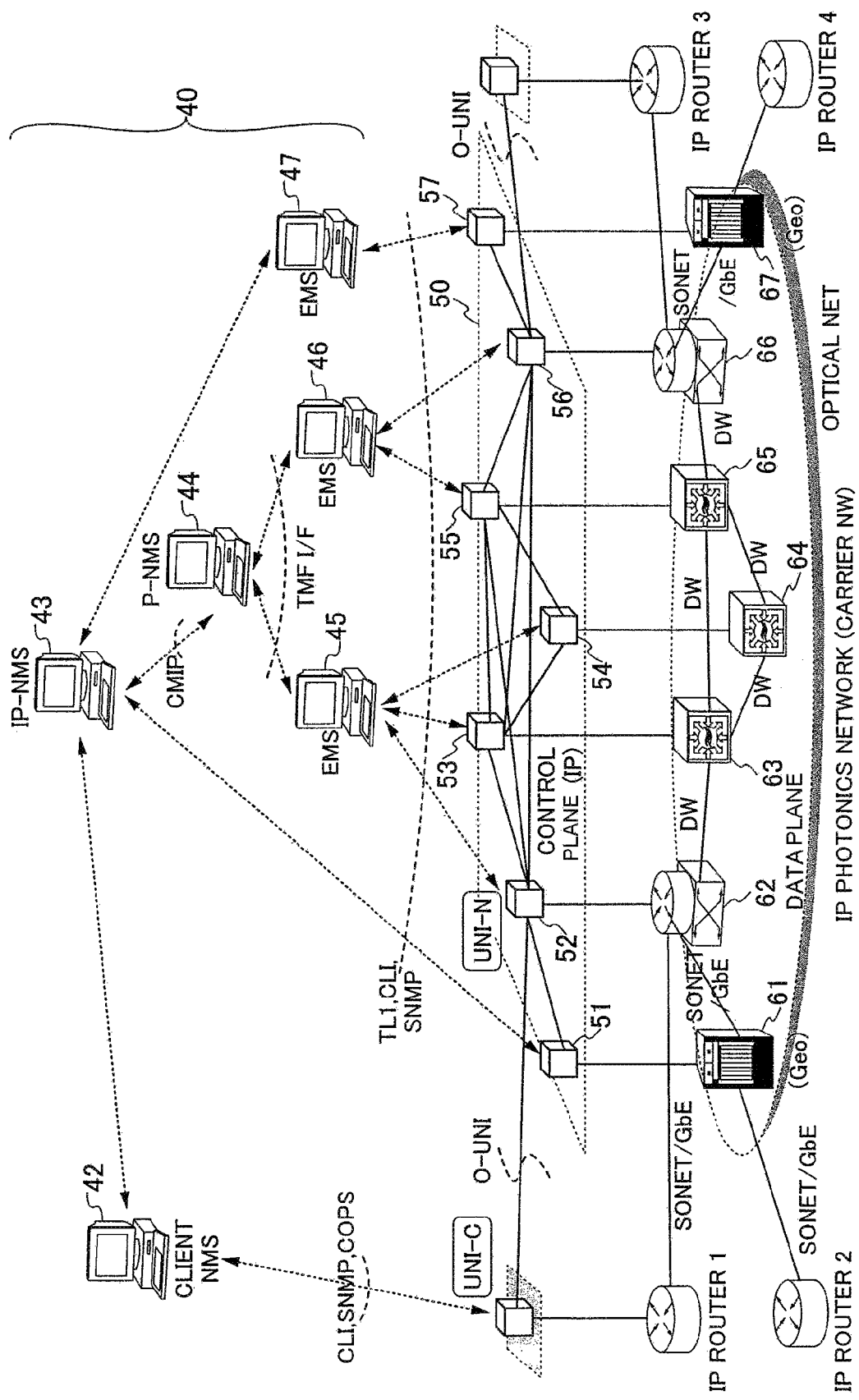
FIG. 11 illustrates the detailed configuration of a communications network system to which the present invention is applied.

FIG. 11 illustrates an example of the communications network system to which the present invention is applied. The control plane 50 is a packet transmission network based on an IP technique, and control nodes 51 through 57 transmit signaling protocol for path setting between each other. The data plane 60 comprises OXC (Optical Cross-Connections) 61 through 67, which are used to transmit user data. Although, in the drawing, the control nodes 51 through 57 are illustrated separate from the OXCs 61 through 67 for the sake of the logical structure based on the functional difference, the control node and the corresponding OXC are mounted in a single apparatus to constitute a node system.

The management plane 40 includes a client 42, an IP-NMS 43, a P-NMS 44, and EMSs 45, 46, and 47. The network management system (NMS) for this management plane 40 transmits a management command using SNMP to a control node of the control plane 50. When transmitting the management command, the network management system (NMS) also transmits specific routing information to the control node in order to establish an optical path along the designated route. The network management system (NMS) may also transmit a TL1 (Transaction Language 1) command to an OXC of the data plane 60 to allow an operator to manually establish a path.

The control nodes successively transmit a signaling message (RSVP-TE) in accordance with the specific routing information provided from the network management system (NMS). Each control node changes the port configuration of the associated (or connected) OXC based on the TL1 command. The OXC may be furnished with an interface capable of receiving commands from both the network management system (NMS) and the associated control node. However, some OXCs that can receive a command only from the network management system (NMS) may also exist.

Figure 12:
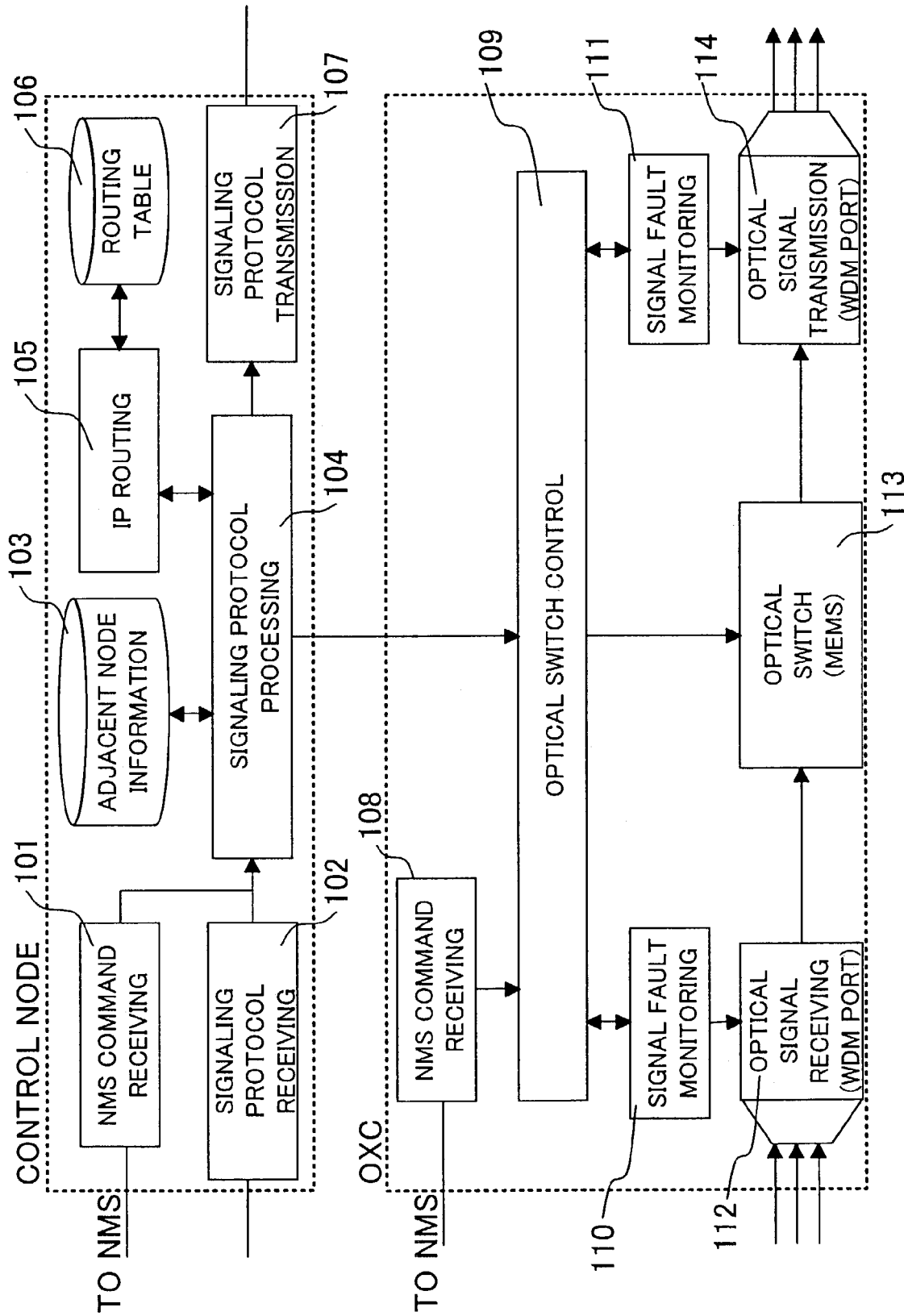
FIG. 12 is a block diagram illustrating an example of a signaling-based communication apparatus comprised of a control node and a communication node.

FIG. 12 is a block diagram illustrating an example of the signaling-based communication apparatus comprised of a control node section and a communication node (OXC) section. In the control node section, the NMS command receiving unit 101 receives specific routing information from the network management system (NMS). The IP routing unit 105 refers to the routing table 106 based on the determination made by the signaling protocol processing unit 104. The signaling protocol processing unit 104 causes the signaling protocol transmission unit 107 to transmit a message to the next adjacent control node.

The adjacent node status table shown in FIG. 4 is stored in the adjacent node information database 103. When the signaling protocol receiving unit 102 receives a message from the previous adjacent control node, the signaling protocol processing unit 104 refers to the adjacent node status table to determine whether to request the network management system (NMS) to carry out the signaling processing on behalf of the next adjacent control node.

In the OXC section, a command produced by the control node section is supplied to the optical switch control unit 109. On the other hand, a command transmitted from the network management system (NMS) is received at the NMS command receiving unit 108, and then supplied to the optical switch control unit 109. The optical switch control unit 109 changes the configuration of the optical switch 113 consisting of MEMS (micro-electro mechanical systems) to cause the optical switch 113 to cross-connect an optical signal. The optical signal multiplexed by WDM (wavelength division multiplexing) is cross-connected by the optical switch 113, and then, supplied to the optical signal transmission unit 114. The signal fault monitoring units 110 and 111 monitor and detect faults of the optical signal. The detection result is fed back to the optical switch control unit 109. Depending on the detection result, the optical control switch control unit 109 again adjusts the configuration of the optical switch 113.

Concerning a non-signaling-based communication apparatus that is not connected to the control plane 50, the network management system (NMS) changes the configuration of such a non-signaling-based communication apparatus. On the data plane 60, a signaling-based communication apparatus located adjacent to the non-signaling-based communication apparatus recognizes the existence of the non-signaling-based communication apparatus, and processes the signaling message on behalf of this non-signaling-based communication apparatus to allow a control message to be successively relayed on the control plane 50. Consequently, an end-to-end path containing a communication node that does not deal with signaling control can be established in the data plane 60. This arrangement is very practical for such a network system that is on the way to introducing a new type communication node furnished with a novel function.

The adjacent node information database 103 shown in FIG. 12 corresponds to adjacent node status storage. The signaling protocol processing unit 104 also implements Step 24 shown in FIG. 6 to carry out a procedure on behalf of the next adjacent non-signaling-based communication apparatus. The signaling protocol transmission unit 107 implements Step 25 shown in FIG. 6 to transmit the signaling message to the next signaling-based communication apparatus adjacent to the non-signaling-based communication apparatus. The signaling protocol processing unit 104 also implements Step 22 shown in FIG. 6 to request the network management system to change the configuration of the non-signaling-based communication node.

This patent application is based on and claims the benefit of the earlier filing date of Japanese Patent Application No. 2002-117533 filed on Apr. 19, 2002.

The invention claimed is:

1. A signaling control method for controlling a signaling process in a communication network system comprised of a management network, a control network, and a user data transmission network, the management network including a network management system, the control network including a plurality of control nodes connected to the management network for conducting signaling control, and the user data transmission network including a plurality of communication nodes consisting of first type communication nodes and second type communication nodes, the method comprising the steps of:

setting one or more signaling-based communication apparatuses in the communications network system, each consisting of one of the control nodes and one of the first type communication nodes, said one of the first type communication nodes being connected to the associated control node and the management network;

setting a non-signaling-based communication apparatus consisting of one of the second type communication nodes in the communications network system, the second type communication nodes being connected to the management network;

causing the network management system to change a configuration of the second type communication node of the non-signaling-based communication apparatus when establishment of a path extending through the non-signaling-based communication apparatus is requested by one of the first type communication nodes located adjacent to one or a group of said second type communication nodes in the user data transmission network; and causing the control nodes of the signaling-based communication apparatuses to successively transmit a signaling message along the requested path in the control network to report the change of the configuration of the second type communication nodes, wherein the second type communication nodes constitutes a domain that includes only the non-signaling-based communication apparatuses, the method further comprising the step of:

causing the network management system to change the configurations of the second type communication nodes of the non-signaling-based communication apparatuses located along the requested path in the domain when establishment of a path extending through the domain is requested.

2. The signaling control method according to claim 1, further comprising the steps of after the network management system changes the configuration of the second type communication node of the non-signaling-based communication apparatus, causing the control node of a first adjacent signaling-based communication apparatus located immediately before the non-signaling-based communication apparatus along the requested path to carry out a procedure on behalf of the non-signaling-based communication apparatus; and causing the control node of the first adjacent signaling-based communication apparatus to transmit the signaling message to a second adjacent signaling-based communication apparatus located immediately after the non-signaling-based communication apparatus along the requested path.

3. The signaling control method according to claim 1, further comprising the steps of causing the control node of a first adjacent signaling-based communication apparatus located immediately before the non-signaling communication apparatus along the requested path to request the network management apparatus to change the configuration of the second type communication node of the non-signaling-based communication apparatus when the first adjacent signaling-based communication apparatus receives the signaling message;

after the change of the configuration of the second type communication node of the non-signaling-based communication apparatus, causing the control node of the first adjacent signaling-based communication apparatus to carry out a procedure on behalf of the non-signaling-based communication apparatus; and causing the control node of the first adjacent signaling-based communication apparatus to transmit the signaling message to a second adjacent signaling-based communication apparatus located immediately after the non-signaling-based communication apparatus along the requested path.

4. The signaling control method according to claim 1, further comprising the steps of after the network management system changes the configurations of the second type communication nodes of the non-signaling-based communication apparatuses along the requested path in the domain, causing the control node of a first adjacent signaling-based communication apparatus located immediately before the domain along the requested path to carry out a procedure on behalf of the non-signaling-based communication apparatuses located along the requested path in the domain; and causing the control node of the first adjacent signaling-based communication apparatus to transmit the signaling message to a second adjacent signaling-based communication apparatus located immediately after the domain along the requested path.

5. The signaling control method according to claim 1, further comprising the steps of causing the control node of a first adjacent signaling-based communication apparatus located immediately before the domain to request the network management apparatus to change the configurations of the second type communication nodes of the non-signaling-based communication apparatuses located along the requested path in the domain when the first adjacent signaling-based communication apparatus receives the signaling message;

after the change of the configurations of the second type communication nodes of the non-signaling-based communication apparatuses, causing the control node of the first adjacent signaling-based communication apparatus to carry out a procedure on behalf of the non-signaling-based communication apparatuses along the requested path in the domain; and causing the control node of the first adjacent signaling-based communication apparatus to transmit the signaling message to a second adjacent signaling-based communication apparatus located immediately after the domain along the requested path.

6. A signaling-based communication apparatus furnished in a communications network system comprised of a management network, a control network, and a user data transmission network, the signaling-based communication apparatus comprising:

a control node belonging to the control network and connected to the management network; and a communication node belonging to the user data transmission network and connected to the control node and the management network, the control node having:

an adjacent node information storage that stores adjacent node information representing whether a next communication node located adjacent to said communication node constitutes a non-signaling-based communication apparatus in the communications network system;

a signaling message receiving unit that receives a signaling message containing a request for establishing a path;

a signaling processing unit that carries out a procedure on behalf of the non-signaling-based communication apparatus, if the next communication node constitutes the non-signaling-based communication apparatus, when the requested path extends through the non-signaling-based communication apparatus; and a signaling message transmission unit that transmits the signaling message to a second control node of a next signaling-based communication apparatus located adjacent to the non-signaling-based communication apparatus, wherein of the requested path extends through a domain consisting of plurality of said non-signaling-based communication apparatuses in the communications network system, the signaling processing unit carries out a procedure on behalf of the non-signaling-based communication apparatuses located along the requested path in the domain, and the signaling message transmission unit transmits the signaling message to a second control node of a next signaling-based communication apparatus located adjacent to the domain, and wherein the signaling processing unit requests a network management system furnished in the management network to change the configurations of the non-signaling-based communication apparatuses located along the requested path in the domain.

7. A network management system furnished in a management network and connected to a control network including a plurality of control nodes for conducting signaling control and to a user data transmission network including a plurality of communication nodes for transmitting user data, wherein the management network, the control network, and the user data transmission network comprise a communication network system that contains one or more signaling-based communication apparatuses, each comprising one of the control nodes and one of the communication nodes, as well as one or more non-signaling-based communication apparatuses, each comprising one of the communication nodes without having the associated control node, the network management system comprising:

a path calculation unit that calculates a path in response to a path setting request generated by one of the communication nodes of the signaling-based communication apparatuses located adjacent to one or a group of the communication nodes of the non-signaling-based communication apparatuses in the user data transmission network; and a changing unit that changes a corresponding configuration of one or more of the communication nodes of the one or more non-signaling-based communication apparatuses located along the calculated path, wherein the control nodes of the signaling-based communication apparatuses successively transmit a signaling message along the requested path in the control network to report the change of the configuration of the one or more of the communication nodes of the one or more non-signaling-based communication apparatuses, and wherein the calculated path extends through a domain consisting of plurality of the non-signaling-based communication apparatuses in the communications network system, and the changing unit changes the corresponding configuration of the one or more communication nodes of the one or more non-signaling-based communication apparatuses located along the calculated path when the network management system receives a configuration change request from the one or more signaling-based communication apparatuses.

8. The network management system according to claim 7, further comprising:

a determination unit that determines whether the calculated path extends through the one or more non-signaling-based communication apparatuses, wherein the changing unit changes the corresponding configuration of the one or more communication nodes of the one or more non-signaling-based communication apparatuses located along the calculated path if the determination unit determines that the calculated path extends through the one or more non-signaling-based communication apparatuses.

* * * * *